(12) United States Patent
Iwaya et al.

(10) Patent No.: US 9,573,462 B2
(45) Date of Patent: Feb. 21, 2017

(54) FUEL STORAGE SYSTEM

(71) Applicant: MITSUBISHI JIDOSHA KOGYO KABUSHIKI KAISHA, Tokyo (JP)

(72) Inventors: Norifumi Iwaya, Obu (JP); Hiroaki Kageyama, Nagoya (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 493 days.

(21) Appl. No.: 13/774,080

(22) Filed: Feb. 22, 2013

(65) Prior Publication Data

US 2013/0221000 A1    Aug. 29, 2013

(30) Foreign Application Priority Data

Feb. 24, 2012   (JP) ................. 2012-038565

(51) Int. Cl.
*B60K 15/035* (2006.01)
*F02M 25/08* (2006.01)
*B60K 15/05* (2006.01)

(52) U.S. Cl.
CPC ...... *B60K 15/03504* (2013.01); *F02M 25/089* (2013.01); *F02M 25/0836* (2013.01); *B60K 2015/0358* (2013.01); *B60K 2015/03576* (2013.01); *B60K 2015/0538* (2013.01)

(58) Field of Classification Search
CPC ............... B60K 15/03504; B60K 2015/0538; F02M 25/0836; F02M 25/089
See application file for complete search history.

(56) References Cited

U.S. PATENT DOCUMENTS

| | | | |
|---|---|---|---|
| 4,521,843 A * | 6/1985 | Pezzolo | H02M 5/2576 307/41 |
| 4,815,436 A * | 3/1989 | Sasaki et al. | 123/520 |
| 4,917,424 A * | 4/1990 | Ishihara et al. | 292/336.3 |
| 5,213,084 A * | 5/1993 | Linder | F02M 59/366 123/456 |
| 5,988,143 A * | 11/1999 | Dietz | F02D 41/3809 123/458 |
| 6,476,732 B1 * | 11/2002 | Stephan | G01C 21/26 340/545.1 |
| 8,755,975 B2 * | 6/2014 | Oakley | 701/49 |

(Continued)

FOREIGN PATENT DOCUMENTS

| | | |
|---|---|---|
| JP | 2003-2399 A | 1/2003 |
| JP | 2003002399 A * | 1/2003 |
| JP | 2005-262905 A | 9/2005 |

*Primary Examiner* — Thienvu Tran
*Assistant Examiner* — Pinping Sun
(74) *Attorney, Agent, or Firm* — Birch, Stewart, Kolasch & Birch, LLP

(57) ABSTRACT

When a driver manipulates a fuel filler lid switch, a tank shutoff valve is opened. Then, time t is calculated, and then, remaining time, obtained by subtracting elapsed time from the time t, is presented on a display device. If the fuel filler lid switch is manipulated again, the tank shutoff valve is closed to seal a fuel tank, and a message to the effect that opening action of the fuel filler lid is cancelled is presented on the display device. If the time t has elapsed without the fuel filler lid switch being manipulated again, the fuel filler lid is opened, determining that internal pressure in the fuel tank has decreased to a level predetermined to ensure that the fuel tank can be filled safely without fuel or fuel evaporative gas spouting from the fuel tank.

2 Claims, 3 Drawing Sheets

(56) References Cited

U.S. PATENT DOCUMENTS

2006/0081035 A1* 4/2006 McLain ................ F02D 33/003
  73/49.3
2010/0015482 A1* 1/2010 Kajiwara .......... H01M 8/04097
  429/515
2013/0042532 A1* 2/2013 Aragon .................. E05B 81/10
  49/357

* cited by examiner

FUEL STORAGE SYSTEM

BACKGROUND OF THE INVENTION

Field of the Invention

The present invention relates to a fuel storage system, and specifically, control of action of a fuel filler lid for a sealed fuel tank.

Description of the Related Art

In a prior-art technique to prevent fuel evaporative gas, produced within a fuel tank, from being emitted to the atmosphere, a sealing valve (tank shutoff valve) is fitted to a passage connecting a fuel tank to a canister to seal the fuel tank, and at the time of filling the fuel tank, the sealing valve is opened to allow fuel evaporative gas to flow from the fuel tank into the canister and become adsorbed within the canister.

When the fuel tank is sealed by the sealing valve as in the aforementioned system, an increase in ambient air temperature may lead to a high pressure in the fuel tank because of more fuel evaporating within the fuel tank, which may lead to fuel evaporative gas being emitted to the atmosphere at the time of opening the fuel filler lid to fill the fuel tank.

To prevent fuel evaporative gas from being emitted to the atmosphere at the time of filling the fuel tank, the sealing valve is opened upon detecting a driver's manipulation for opening the fuel filler lid, before the fuel filler lid is opened, to allow fuel evaporative gas to flow from the fuel tank into the canister, thereby decreasing the pressure in the fuel tank to a sufficiently low level in advance, and then, the fuel filler lid is opened (JP 2005-262905 A).

In the fuel storage system disclosed in the aforementioned publication, when the driver performs manipulation for opening the fuel filler lid, the pressure in the fuel tank is decreased and then the fuel filler lid is opened.

This means that in the fuel storage system disclosed in publication 1, once the driver performs manipulation for opening the fuel filler lid, the fuel filler lid is not opened until the pressure in the fuel tank decreases to a predetermined level.

For example, when washing a vehicle, if the pressure in the fuel tank is high, the fuel filler lid is opened to wipe moisture from the inner side of the fuel filler lid. In such case, if the pressure in the fuel tank is not easily relieved, it takes long time to decrease the pressure in fuel tank to a desired level, and thus, it takes long time until the fuel filler lid can be opened.

The driver's having to wait for a long time until the fuel filler lid is opened is inconvenient and undesirable.

SUMMARY OF THE INVENTION

An object of the present invention is to provide a fuel storage system providing improved convenience.

To achieve the above object, the present invention provides a fuel storage system, comprising: a tank opening/closing unit switchable between an open and a closed positions to allow or block flow in a connecting passage connecting an fuel tank and a canister both mounted on a vehicle, a lid action control unit which is manipulated to control opening and closing actions of a fuel filler lid provided to cover a fuel filler opening of the fuel tank, and a filling preparation control unit which, in response to manipulation of the lid action control unit, performs filling preparation control to put the tank opening/closing unit in the open position, and after passage of a predetermined time, open the fuel filler lid, wherein the filling preparation control unit stops the filling preparation control when detecting that the lid action control unit is manipulated again before the predetermined time elapses.

In the present invention described above, if the predetermined time from when the driver manipulates the lid action control unit until the fuel filler lid can be opened is long, for example, opening of the fuel filler lid can be cancelled by manipulating the lid action control unit before the fuel filler lid is opened. The driver can thus cancel opening of the fuel filler lid anytime he/she wants, which is improved convenience to the driver.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Figure 1:
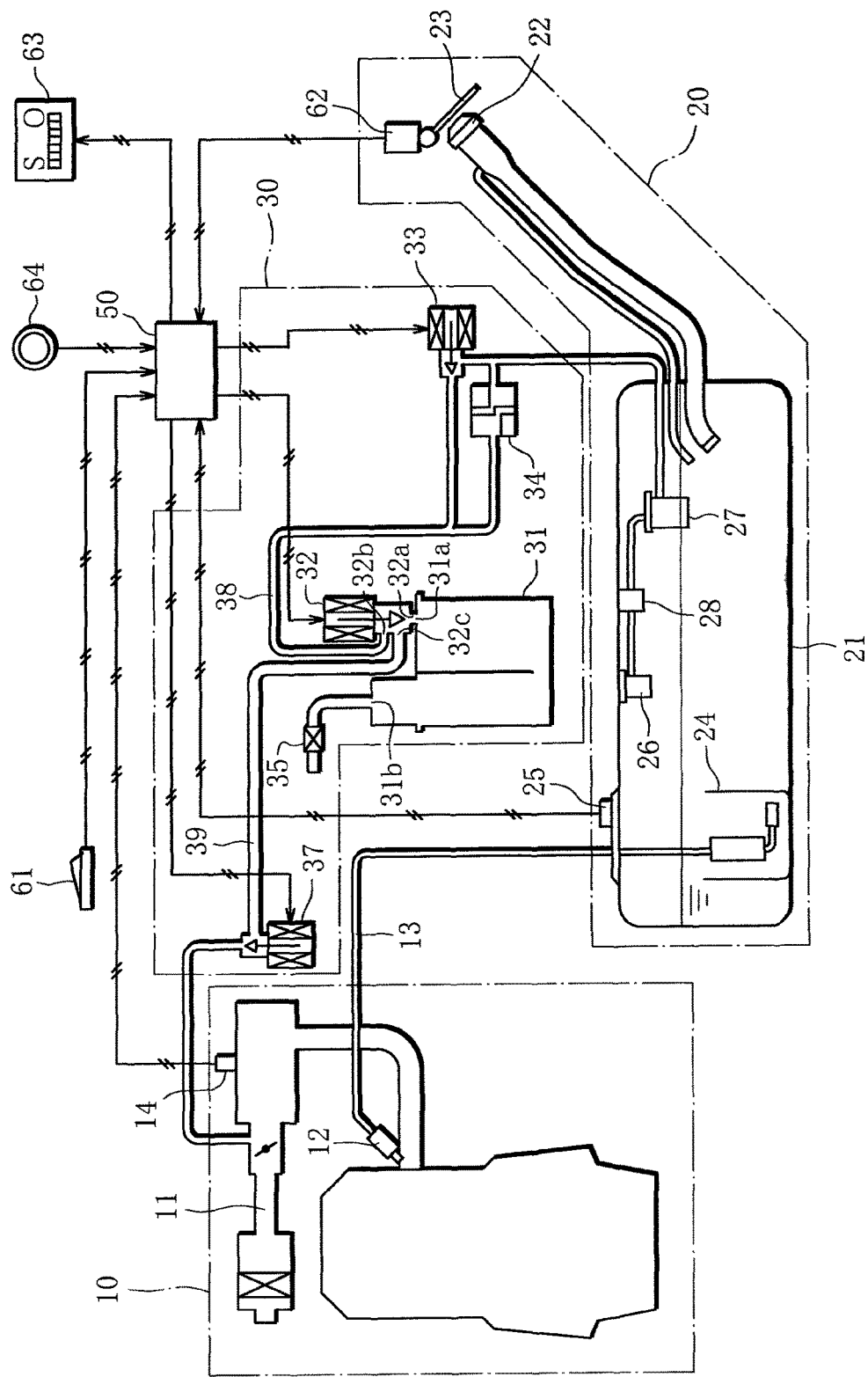
FIG. 1 is a diagram schematically showing the configuration of a fuel storage system according to the present invention.

Referring to the drawings attached, a fuel storage system according to the present invention will be described below.

FIG. 1 is a diagram schematically showing the configuration of a fuel storage system according to the present invention. Now the configuration of the fuel storage system according to the present invention will be described.

As seen in FIG. 1, the fuel storage system according to the present invention comprises an engine (internal combustions engine) 10, a fuel storage unit 20, a fuel evaporative gas management unit 30 and an electronic control unit (hereinafter referred to as "ECU") (lid action control unit, vehicle state detection unit, filling preparation control unit) 50, which are systems mounted on the vehicle, and further comprises a fuel filler lid switch (lid action control unit) 61, a fuel filler lid sensor 62, a display device 63 and a main switch (vehicle state detection unit) 64. The fuel storage unit 20 holds fuel, the fuel evaporative gas management unit 30 manages fuel evaporative gas produced in the fuel storage unit 20, and the ECU 50 performs general control of the vehicle and includes an input-output device, memory (including ROM, RAM and non-volatile RAM) and a central processing unit (CPU). The fuel filler lid switch 61 is a momentary switch manipulated to open a fuel filler lid 23 of the vehicle, the fuel filler lid sensor 62 detects whether the fuel filler lid 23 is open or closed, the display device 63 presents information about vehicle state and others, and the main switch 64 is a momentary switch manipulated to connect or disconnect a main power source. The lid action control unit may include a switch for opening the lid and a switch for cancelling the opening of the lid, separately.

The engine 10 is a multi-point injection (MPI) four-cycle inline four-cylinder gasoline engine. The engine 10 has an intake passage 11 through which air is drawn into combustion chambers of the engine 10. An intake pressure sensor 14 is fitted to the intake passage 11 to detect internal pressure in the intake passage 11. Downstream of the intake passage 11, fuel injection valves 12 are provided to inject fuel to intake ports of the engine 10. The fuel injection valves 12 are connected to fuel piping 13, through which fuel is sent to them.

The fuel storage unit 20 comprises a fuel tank 21 to hold fuel, a fuel filler opening 22 through which fuel is put into the fuel tank 21, a fuel filler lid 23 fitted to the vehicle body to close the fuel filler opening 22, a fuel pump 24 to send fuel from the fuel tank 21 to the fuel injection valves 12 through the fuel piping 13, a pressure sensor 25 for detecting internal pressure in the fuel tank 21, a fuel cut-off valve 26 for preventing fuel from flowing from the fuel tank 21 to the fuel evaporative gas management unit 30 by action of a float valve incorporated therein, not shown, a leveling valve 27 to control liquid surface in the fuel tank 21 when filling the fuel tank, a two-way valve 28 having an orifice with an inside diameter (φ1.0 mm, for example) smaller than the inside diameter of piping including vapor piping (connecting passage) 38 and purge piping 39, described later, and restricting the amount of fuel fed to the fuel tank when filling the fuel tank nearly full, or in other words, topping the fuel tank off, and a fuel quantity detection device for detecting the amount of fuel present in the fuel tank 21, not shown. Fuel evaporative gas, produced within the fuel tank 21, is emitted from the fuel tank 21, by directly entering and passing through a lower part of the leveling valve 27 or passing through the fuel cut-off valve 26, the two-way valve 27 and the leveling valve 27.

The fuel evaporative gas management unit 30 comprises a canister 31, a vapor solenoid valve 32, a tank shutoff valve (tank opening/closing unit) 33, a safety valve 34, an air filter 35, a purge control valve 37, vapor piping 38, and purge piping 39.

The canister 31 holds activated carbon inside. The canister 31 has a vapor port 31a through which fuel evaporative gas from the fuel tank 21 can flow in and fuel evaporative gas, adsorbed on the activated carbon, can flow out. The canister 31 also has an ambient air inlet 31b to draw in ambient air to cause fuel evaporative gas to be released from the activated carbon and emitted from the canister 31. Upstream of the ambient air inlet 31b, an air filter 35 is arranged with its contaminants-entry prevention side directed to the atmosphere and the opposite side directed to the ambient air inlet 31b.

The vapor solenoid valve 32 has a canister-connected port 32a connected to the vapor port 31a of the canister 31. The vapor solenoid valve 32 further has a vapor piping-connected port 32b connected to the vapor piping 38, and a purge piping-connected port 32c connected to the purge piping 39. The vapor piping 38 is connected to the leveling valve 27 of the fuel tank 21, and the purge piping 39 is connected to the intake passage 11 of the engine 10. The vapor solenoid valve 32 is a normally-closed solenoid valve which is closed while a solenoid is not activated, and open while the solenoid is activated externally by drive signal. While the solenoid is activated externally by drive signal, the vapor solenoid valve 32 in the open position keeps the canister-connected port 32a, the vapor piping-connected port 32b and the purge piping-connected port 32c open, so that fuel evaporative gas can flow in and out the canister 31, and ambient air, drawn in through the air filter 35, can flow in the vapor piping 32 and the purge piping 39. While the solenoid is not activated, the vapor solenoid valve 32 in the closed position keeps only the vapor piping-connected port 32b and the purge piping-connected port 32c open, and blocks the canister-connected port 32a, thereby inhibiting fuel evaporative gas from flowing in and out the canister 31 and inhibiting ambient air from flowing in the vapor piping 38 and purge piping 39 via the air filter 35. In other words, while in the closed position, the vapor solenoid valve 32 shuts the canister 31 off, and while in the open position, it keeps the canister 31 open.

The tank shutoff valve 33 is fitted to the vapor piping 38. The tank shutoff valve 33 is a normally-closed solenoid valve which is closed while a solenoid is not activated, and open while the solenoid is activated externally by drive signal. While the solenoid is not activated, the tank shutoff valve 33 in the closed position blocks the vapor piping 38. While the solenoid is activated externally by drive signal, the tank shutoff valve 33 in the open position allows flow in the vapor piping 38. In other words, while in the closed position, the fuel tank shutoff valve 33 seals the fuel tank 21 so that fuel evaporative gas, produced in the fuel tank 21, cannot flow out the fuel tank 21, and while in the open position, it allows fuel evaporative gas to flow from the fuel tank 21 to the canister 31.

The safety valve 34 is fitted to the vapor piping 38, in parallel with the tank shutoff valve 33. The safety valve 34 opens when the internal pressure in the fuel tank 21 increases to a preset level or higher, thereby allowing fuel evaporative gas to flow to the canister 31 to prevent explosion of the fuel tank 21.

The purge solenoid valve 37 is fitted to the purge piping 39, between the intake passage 11 of the engine 10 and the vapor solenoid valve 32. The purge control valve 37 is a normally-closed solenoid valve which is closed while a solenoid is not activated, and open while the solenoid is activated externally by drive signal. While the solenoid is not activated, the purge control valve 37 in the closed position blocks the purge piping 39. While the solenoid is activated externally by drive signal, the purge control valve 37 in the open position allows flow in the purge piping 39. In other words, while in the closed position, the purge control valve 37 inhibits fuel evaporative gas from flowing from the fuel evaporative gas management unit 30 to the engine 10, and while in the open position, it allows fuel evaporative gas to flow from the fuel evaporative gas management unit 30 to the engine 10.

The display device 63 presents information about vehicle state. Time from when the fuel filler lid switch 61 is manipulated until the fuel filler lid 23 can be opened, or a message to the effect that opening action of the fuel filler lid 23 is cancelled is presented on the display device 63, for example.

The ECU 50 is a control system performing general control of the vehicle, and comprises an input-output device, memory (including ROM, RAM and non-volatile RAM), a central processing unit (CPU), a timer and others.

To the input of the ECU 50 are connected the intake pressure sensor 14, the pressure sensor 25, the fuel filler lid switch 61 for opening and closing the fuel filler lid 23 fitted to the vehicle, the fuel filler lid sensor 62 for detecting whether the fuel filler lid 23 is open or closed, and the main switch 64 for connecting or disconnecting the main power source of the vehicle. The ECU 50 thus receives information from these sensors.

To the output of the ECU 50 are connected the fuel injection valves 12, the fuel pump 24, the vapor solenoid valve 32, the tank shutoff valve 33, the purge solenoid valve 37 and the display device 63.

On the basis of information from the sensors, the ECU 50 controls action of the fuel filler lid 23, the vapor solenoid valve 32, the tank shutoff valve 33 and the purge control valve 37; pressure in the fuel tank 21, pressure in the vapor piping 38 and purge piping 39 between the tank shutoff valve 33 and the purge solenoid valve 37; and flow of fuel evaporative gas, including adsorption within the canister 31 and emission from the canister 31 into the intake passage 11 of the engine 10.

[First Embodiment]

Next, with regard to a first embodiment of the fuel storage system according to the present invention, how the ECU 50 controls action of the fuel filler lid 23 in response to the driver's manipulating the fuel filler lid switch 61 will be described.

Figure 2:
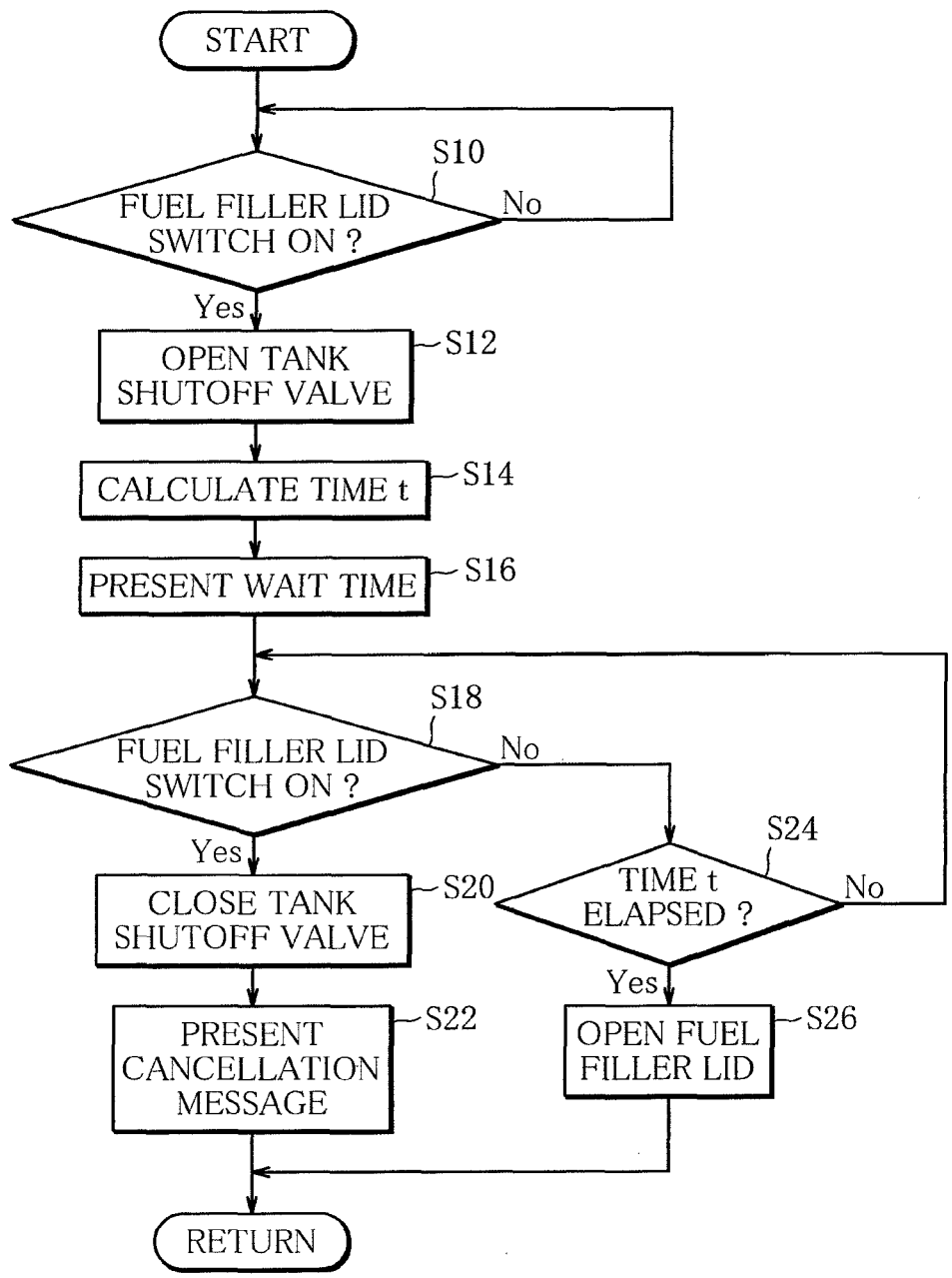
FIG. 2 is a flow chart showing fuel filler lid action control performed in a first embodiment of the fuel storage system according to the present invention.

FIG. 2 is a flow chart showing fuel filler lid action control performed in the first embodiment of the fuel storage system according to the present invention.

As seen in FIG. 2, at step S10, whether the fuel filler lid switch 61 has been brought into "ON" position, or in other words, manipulated is determined. If the result of determination is "Yes", namely it is determined that the fuel filler lid switch 61 has been brought into "ON" position, or in other words, manipulated, control flow goes to step S12. If the result of determination is "No", namely it is determined that the fuel filler lid switch 61 has not been brought into "ON" position, or in other words, not manipulated, step S10 is performed again. Thus, manipulating the fuel filler lid switch 61 is a trigger that initiates the fuel filler lid action control.

At step S12, the tank shutoff valve 33 is opened. If the lid is removed from the fuel filler opening 22 of the fuel tank 21 having high internal pressure, fuel or fuel evaporative gas may spout from the fuel tank 21. Thus, the tank shutoff valve 33 is opened to allow fuel, evaporative gas to flow from the fuel tank 21 to the canister 31 and become adsorbed on the activated carbon, thereby decreasing the internal pressure in the fuel tank 21. Control flow then goes to step S14.

At step S14, time t ("predetermined time" in claims) is calculated. Time t is the time from when the tank shutoff valve 33 is opened until the internal pressure in the fuel tank 21 decreases to a level ("value" in claims) predetermined to ensure that fuel or fuel evaporative gas does not spout from the fuel tank 21 when the lid is removed from the fuel filler opening of the fuel tank 21. By experiment, simulation or the like, a map is created in advance which provides values of time t depending on internal pressure in the fuel tank 21 and fuel quantity in the fuel tank 21. Using the map, the time t until the internal pressure in the fuel tank 21 decreases to the predetermined level is calculated from the internal pressure in the fuel tank 21, detected by the pressure sensor 25, and the amount of fuel present in the fuel tank 21, detected by the fuel quantity detection device. Control flow then goes to step S16. If, for example fuel is present in the fuel tank 21 in such an amount that the lower part of the leveling valve 27 is under the fuel, fuel evaporative gas cannot be emitted from the fuel tank 21 to the vapor piping 38 by directly entering and passing through the lower part of the leveling valve 27; fuel evaporative gas is emitted from the fuel tank 21 to the vapor piping 38 by passing through the fuel cut-off valve 26, the two-way valve 28 and the leveling valve 27. Thus, when fuel is present in the fuel tank 21 in so large an amount that the lower part of the leveling valve 27 is under the fuel, the time t until the internal pressure in the fuel tank 21 decreases to the predetermined level is long, compared with when fuel is present in the fuel tank in an amount not reaching the leveling valve 27, even with the same internal pressure in the fuel tank, since the fuel evaporative gas is emitted via the two-way valve 28 having an orifice restricting the flow rate of the fuel evaporative gas.

At step S16, wait time is presented on the display device 63. Specifically, remaining time, obtained by subtracting time elapsed after opening the tank shutoff valve 33 at step S12 from the time t calculated at step S14, is presented on the display device 63. Control flow then goes to step S18. In the present embodiment, as the elapsed time after start (S) increases, graphically-represented remaining time decreases, and when the opening action of the fuel filler lid 23 is completed, a message "LID OPEN" is presented. Filling preparation control continues until the remaining time becomes zero. The remaining time may be presented in figures.

At step S18, whether the fuel filler lid switch 61 has been brought into "ON" position again, or in other words, manipulated again is determined. If the result of determination is "Yes", namely it is determined that the fuel filler lid switch 61 has been brought into "ON" position again, or in other words, manipulated again, control flow goes to step S20. If the result of determination is "No", namely it is determined that the fuel filler lid switch 61 has not been brought into "ON" position, or in other words, manipulated, control flow goes to step S24.

At step S20, the tank shutoff valve 33 is closed, or in other word, the fuel tank 21 is sealed. Control flow then goes to step S22.

At step S22, a message to the effect that the opening action of the fuel filler lid 23 is cancelled is presented on the display device 63. Control flow then exits the routine.

At step S24, whether the time t has elapsed is determined. Specifically, by determining whether the time t has elapsed after opening the tank shutoff valve 33 at step S12, whether the internal pressure in the fuel tank 21 has decreased to the predetermined level is determined. If the result of determination is "Yes", namely it is determined that the time t has elapsed after opening the tank shutoff valve 33, and thus, it is determined that the internal pressure in the fuel tank 21 has decreased to the predetermined level, control flow goes to step S26. If the result of determination is "No", namely it is determined that the time t has not elapsed after opening the tank shutoff valve 33, and thus, it is determined that the internal pressure in the fuel tank 21 has not decreased to the predetermined level, control flow goes back to step S18.

At step S26, the fuel filler lid 23 is opened. Specifically, the fuel filler lid 23 is opened, determining that the internal pressure in the fuel tank 21 has decreased to the level predetermined to ensure that the fuel tank 21 can be filled safely without fuel or fuel evaporative gas spouting from the fuel tank 21 when the lid is removed from the fuel filler opening of the fuel tank 21. Then, control flow returns from the routine.

As stated above, in the first embodiment of the fuel storage system according to the present invention, when the driver manipulates the fuel filler lid switch 61, the tank shutoff valve 33 is opened to allow fuel evaporative gas to flow from the fuel tank 21 to the canister 31 and become adsorbed on the activated carbon, thereby decreasing the internal pressure in the fuel tank 21. Then, time t from when the tank shutoff valve 21 is opened until the internal pressure in the fuel tank 21 decreases to the predetermined level is calculated from the internal pressure in the fuel tank 21 and the amount of fuel present in the fuel tank 21, using the map prepared to provide values of time t depending on internal pressure in the fuel tank 21 and fuel quantity in the fuel tank 21. Then, the remaining time, obtained by subtracting the time elapsed after opening the tank shutoff valve 21 from the time t, is presented on the display device 63. If the fuel filler lid switch 61 is manipulated again, the tank shutoff valve 21 is closed to seal the fuel tank 21, and a message to the effect that the opening action of the fuel filler lid 23 is cancelled is presented on the display device 63. If the time t has elapsed after opening the tank shutoff valve 21 without the fuel filler lid switch 61 being manipulated again, the fuel filler lid 23 is opened, determining that the internal pressure in the fuel tank 21 has decreased to the level predetermined to ensure that the fuel tank 21 can be filled safely without fuel or fuel evaporative gas spouting from the fuel tank 21.

If fuel is present in the fuel tank 21 in such an amount that the lower part of the leveling valve 27 is under the fuel and if the internal pressure in the fuel tank 21 is high, fuel evaporative gas is emitted from the fuel tank 21 to the vapor piping 38 via the fuel cut-off valve 26, the two-way valve 28 and the leveling valve 27. In this case, it takes long time from when the driver manipulates the fuel filler lid switch 61 until the fuel filler lid 23 can be opened, since the two-way valve 28 has an orifice restricting the flow rate of the fuel evaporative gas. To deal with this problem, the present embodiment is arranged such that if the driver manipulates the fuel filler lid switch 61 again before the fuel filler lid 23 is opened, the tank shutoff valve 33 is closed and the opening of the fuel filler lid 23 is cancelled. The driver can thus cancel the opening of the fuel filler lid 23 anytime he/she wants, which is improved convenience to the driver.

The fuel filler lid 23 is opened after the internal pressure in the fuel tank 21 decreases to the predetermined level. This prevents the internal pressure in the fuel tank 21 from causing fuel or fuel evaporative gas to spout from the fuel tank 21 when the lid is removed from the fuel filler opening of the fuel tank 21.

[Second Embodiment]

Next, with regard to a second embodiment of the fuel storage system according to the present invention, how the ECU 50 controls action of the fuel filler lid 23 in response to the driver's manipulating the fuel filler lid switch 61 will be described.

Figure 3:
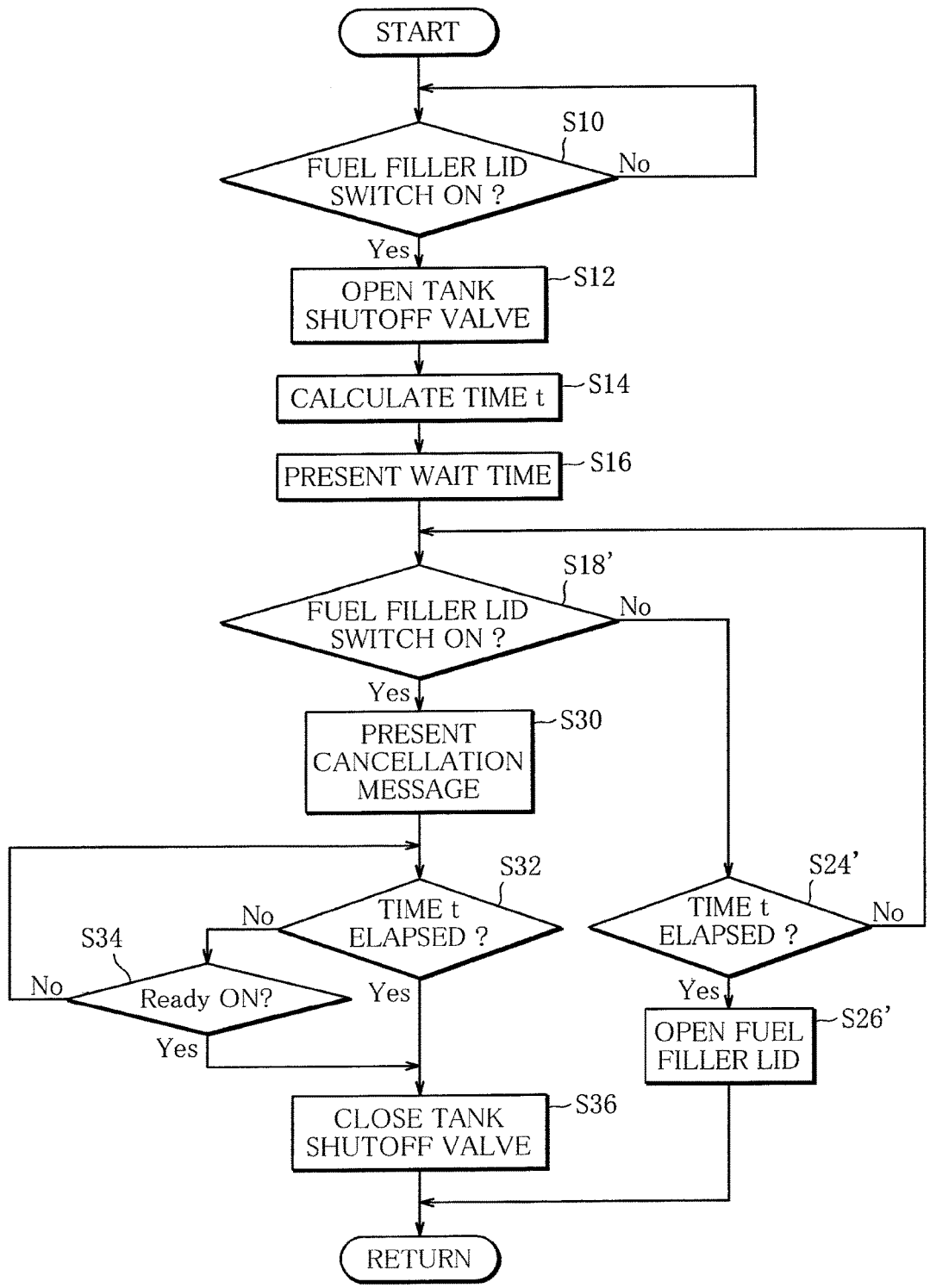
FIG. 3 is a flow chart showing fuel filler lid action control performed in a second embodiment of the fuel storage system according to the present invention.

FIG. 3 is a flow chart showing fuel filler lid action control performed in the second embodiment of the fuel storage system according to the present invention.

As seen in FIG. 3, the fuel filler lid action control performed in the second embodiment of the fuel storage system according to the present invention differs from that in the first embodiment in the control after the driver's manipulating the fuel filler lid switch 61 again. The difference from the first embodiment will be described below.

As seen in FIG. 3, steps S10 to S16 are the same as those in the first embodiment. Specifically, when the driver manipulates the fuel filler lid switch 61, the tank shutoff valve 33 is opened to allow fuel evaporative gas to flow from the fuel tank 21 to the canister 31 and become adsorbed on the activated carbon, thereby decreasing the internal pressure in the fuel tank 21. Then, the time t from when the tank shutoff valve 33 is opened until the internal pressure in the fuel tank decreases to a predetermined level is calculated from the internal pressure in the fuel tank 21 and the amount of fuel present in the fuel tank 21, using a map prepared to provide values of time t depending on internal pressure in the fuel tank 21 and fuel quantity in the fuel tank 21. Then, the remaining time, obtained by subtracting the time elapsed after opening of the tank shutoff valve 33 from the time t, is presented on the display device 63.

Then, at step S18', whether the fuel filler lid switch 61 has been brought into "ON" position again, or in other words, manipulated again is determined, as in the first embodiment. If the result of determination is "Yes", namely it is determined that the fuel filler lid switch 61 has been brought into "ON" position again, or in other words, manipulated again, control flow goes to step S30. If the result of determination is "No", namely it is determined that the fuel filler lid switch 61 has not been brought into "ON" position, or in other words, manipulated, control flow goes to step S24'.

At step S30, a message to the effect that the opening action of the fuel filler lid 32 is cancelled is presented on the display device 63. Control flow then goes to step S32.

At step S32, whether the time t has elapsed is determined. Specifically, by determining whether the time t has elapsed after opening the tank shutoff valve 33 at step S12, whether the internal pressure in the fuel tank 21 has decreased to the predetermined level is determined. If the result of determination is "Yes", namely it is determined that the time t has elapsed after opening the tank shutoff valve 33, and thus, it is determined that the internal pressure in the fuel tank 21 has decreased to the predetermined level, control flow goes to step S36. If the result of determination is "No", namely it is determined that the time t has not elapsed after opening the tank shutoff valve 33, and thus, it is determined that the internal pressure in the fuel tank 21 has not decreased to the predetermined level, control flow goes back to step S34.

At step S34, whether the vehicle is in "Ready ON" state ("startup state" in claims), or in other words, whether the vehicle has become ready to move by the driver's manipulating the main switch 64 is determined. If the result of determination is "Yes", namely it is determined that the vehicle has become ready to move by the driver's manipulating the main switch 64, control flow goes to step S36. If the result of determination is "No, namely it is determined that the driver has not manipulated the main switch 64 and thus the vehicle is not ready to move, control flow goes back to step S32.

At step S36, the tank shutoff valve 33 is closed to seal the fuel tank 21. Control flow then returns from the routine.

At step S24', whether the time t has elapsed is determined as in the first embodiment. Specifically, by determining whether the time t has elapsed after opening the tank shutoff valve 33, whether the internal pressure in the fuel tank 21 has decreased to the predetermined level is determined. If the result of determination is "Yes", namely it is determined that the time t has elapsed after opening the tank shutoff valve 33, and thus, it is determined that the internal pressure in the fuel tank 21 has decreased to the predetermined level, control flow goes to step S26'. If the result of determination is "No", namely it is determined that the time t has not elapsed after opening the tank shutoff valve 33, and thus, it is determined that the internal pressure in the fuel tank 21 has not decreased to the predetermined level, control flow goes back to step S18'.

At step S26', the fuel filler lid 23 is opened. Specifically, the fuel filler lid 23 is opened, determining that the internal pressure in the fuel tank 21 has decreased to the level predetermined to ensure that the fuel tank 21 can be filled safely without fuel or fuel evaporative gas spouting from the fuel tank 21 when the lid is removed from the fuel filler opening of the fuel tank 21. Then, control flow returns from the routine.

As stated above, in the second embodiment of the fuel storage system according to the present invention, when the driver manipulates the fuel filler lid switch 61, the tank shutoff valve 33 is opened to allow fuel evaporative gas to flow from the fuel tank 21 to the canister 31 and become adsorbed on the activated carbon, thereby decreasing the internal pressure in the fuel tank 21. Then, time t from when the tank shutoff valve 21 is opened until the internal pressure in the fuel tank 21 decreases to the predetermined level is calculated from the internal pressure in the fuel tank 21 and the amount of fuel present in the fuel tank 21, using the map prepared to provide values of time t depending on internal pressure in the fuel tank 21 and fuel quantity in the fuel tank 21. Then, the remaining time, obtained by subtracting the time elapsed after opening the tank shutoff valve 21 from the time t, is presented on the display device 63. If the fuel filler lid switch 61 is manipulated again, a message to the effect that the opening action of the fuel filler lid 23 is cancelled is presented on the display device 63. Then, when it is determined that the time t has elapsed after opening the tank shutoff valve 33 or when it is determined that the vehicle is in startup state, or in other words, ready to move, the tank shutoff valve 21 is closed to seal the fuel tank 21. If the time t has elapsed after opening the tank shutoff valve 21 without the fuel filler lid switch 61 being manipulated again, the fuel filler lid 23 is opened, determining that the internal pressure in the fuel tank 21 has decreased to the level predetermined to ensure that the fuel tank 21 can be filled safely without fuel or fuel evaporative gas spouting from the fuel tank 21.

The second embodiment is thus arranged such that when it takes long time until the fuel filler lid 23 can be opened, the driver can manipulate the fuel filler lid switch 61 again to close the tank shutoff valve 33 and cancel the opening of the fuel filler lid 23, as in the first embodiment. The driver can thus cancel the opening of the fuel filler lid 23 anytime he/she wants, which is improved convenience to the driver.

If the opening of the fuel filler lid 23 cancelled, the tank shutoff valve 33 is closed when it is determined that the time t has elapsed after opening the tank shutoff valve 33 or when it is determined that the vehicle is in startup state, or in other words, ready to move. This means that even when the opening of the fuel filler lid 23 is cancelled, the internal pressure in the fuel tank 21 is relieved.

Since the internal pressure in the fuel tank 21 is relieved, next time the fuel filler lid switch 61 is manipulated, it does not take long time until the internal pressure in the fuel tank decreases to the level allowing the fuel filler lid 23 to be opened.

In the above, embodiments of the present invention have been described. The present invention is however not restricted to the described embodiments.

For example, in the described embodiments, when the time t has elapsed after opening the tank shutoff valve 33, the fuel filler lid 21 is opened or the tank shutoff valve 33 is closed. The present invention is not restricted to this but may be arranged such that when the internal pressure in the fuel tank 21, monitored all the time, decreases to a predetermined level, the fuel filler lid 23 is opened or the tank shutoff valve 33 is closed.

In the second embodiment, whether the vehicle is ready to move is determined by determining whether the driver has manipulated the main switch 64. The present invention is not restricted to this but may be arranged such that whether the vehicle is moving is determined on the basis of information from a vehicle speed sensor fitted to the vehicle.

What is claimed is:

1. A fuel storage system, comprising:
a tank opening/closing unit switchable between an open and a closed positions to allow or block flow in a connecting passage connecting a fuel tank and a canister both mounted on a vehicle;
a pressure detection unit which detects internal pressure in the fuel tank;
a fuel quantity detection unit which detects the amount of fuel present in the fuel tank;
a lid action control unit which is manipulated to control opening and closing actions of a fuel filler lid provided to cover a fuel filler opening of the fuel tank; and
a filling preparation control unit which, in response to manipulation of the lid action control unit, performs filling preparation control to put the tank opening/closing unit in the open position, and after passage of a time which is time until internal pressure in the fuel tank decreases to a predetermined value or below, open the fuel filler lid, wherein
the filling preparation control unit closes the tank opening/closing unit and stops the filling preparation control when detecting that the lid action control unit is manipulated again before the time elapses, and
the time is set based on the internal pressure detected by the pressure detection unit and the amount of fuel by the fuel quantity detection unit.

2. The fuel storage system according claim 1, further comprising:
a vehicle state detection unit which determines whether the vehicle is in startup state, wherein
the filling preparation control unit puts the tank opening/closing unit in the closed position when the vehicle state detection unit determines that the vehicle is in startup state.

* * * * *